Patented June 1, 1943

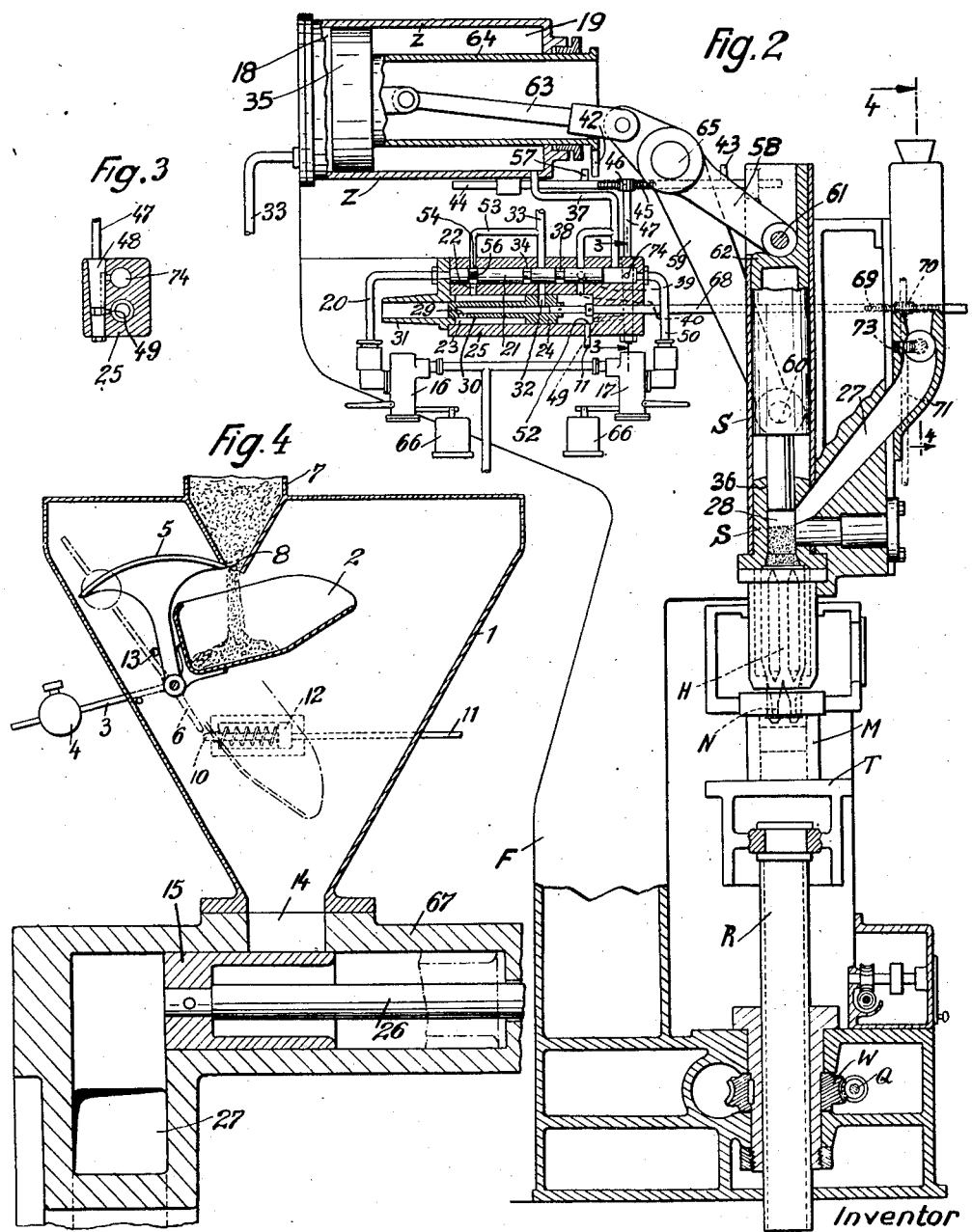

2,320,594

UNITED STATES PATENT OFFICE 2,320,594

INJECTION MOLDING MACHINE

Emil Hempel, Zerbst, Germany; vested in the Alien Property Custodian

Application October 4, 1939, Serial No. 297,837
In Germany July 7, 1938

5 Claims. (Cl. 18—30)

My invention relates to an injection molding machine in which a predetermined quantity of a thermoplastic material is fed in solid, preferably granulated, condition into a cylinder and is heated therein whereby it is rendered plastic and is then injected by a piston into a mold.

In machines of this type the necessity arises for charging the injection cylinder with a predetermined quantity of material for any cycle of operation, the quantity corresponding to the volume of the mold. This is particularly true with machines operating automatically.

Prior to the present invention it was customary to measure this quantity by feeding a predetermined volume of the granulated material to the cylinder. This method, however, is inaccurate because the weight of this volume varies between wide limits depending on the size of the granules which may amount from minute dimensions corresponding to a pulverized material up to more than ⅛ of an inch.

In an injection molding machine of a known type, the quantity of the material supplied to the injection cylinder depends on the point at which the piston thereof has come to rest on the preceding injection stroke. If it happens, on account of a surplus of thermoplastic material fed into the cylinder, over the volume of the mold, that the injection piston comes to a stop on its injection stroke before reaching its extreme position, the subsequent return stroke of the piston will be accordingly shorter since the piston always returns to the same initial position. Upon return of the piston, the surplus of material left in the cylinder when the mold is filled, will reduce the cylinder space which is then filled with the granulated material. Therefore, a smaller quantity of granulated material will be fed to the machine in that cycle following a cycle in which an excessive quantity of material was supplied to the cylinder, and any surplus of material is left over to be consumed in the following cycle. Thus, variations of the quantity are automatically compensated. This is the best solution of the problem of dosing the material which has become known. An overcrowding of the injection cylinder is precluded by this method. Nevertheless the variations in the quantity actually supplied to the cylinder in consecutive cycles adversely affect the quality of the work pieces.

In another machine of a known type a predetermined quantity of the granulated material is supplied per cycle to the injection cylinder, the quantity being measured by an adjustable measuring space. This method is unsatisfactory because of the unavoidable variations in the density of the material occasioned by the variable sizes of the granules. If the quantity is too large thus preventing the piston from completing its injection stroke up to its extreme position, the full volume of material is nevertheless fed to the injection cylinder in the subsequent cycle, thus producing faulty work pieces for a number of consecutive cycles before the machine will work properly again.

It is the object of the present invention to avoid all of these disadvantages, and to provide a machine for molding comparatively large work pieces by an automatic operation resulting in a very uniform production.

In order to attain these objects I equip the machine with a weighing mechanism such as a balance which will measure the quantity to be fed to the injection cylinder. Hence, a predetermined weight of material will be accurately supplied per cycle to the heating cylinder irrespective of the size of granules or, in other words, irrespective of the density of the material, thus ensuring that the same quantity of plastic material will be always injected into the mold and that the injection piston will invariably come to rest at the same point of its stroke at any cycle. Moreover, an overcrowding of the mold is precluded which would be liable to produce burrs on account of the excessive hydrostatic pressure set up in the mold.

The invention is primarily applicable to injection molding machines of the type in which the pressure of the injection piston increases in accordance with a fixed characteristic as the piston approaches the mold. When applied to this type of machine the invention ensures that the final pressure exerted by the piston on the injected material, when the mold is completely filled, will be always the same at any cycle. Hence, the work pieces produced will be of uniform quality.

The weighing mechanism is preferably so connected with a shutter for the hopper feeding the material to the scale that the hopper will be closed as soon as a predetermined weight of material has been supplied to the scale.

A particularly simple construction is obtained according to another feature of my invention by constructing the closing member as a rotary shutter rigidly connected with the balance of the weighing mechanism and adapted, when the scale sinks, to move beneath the mouth of the hopper thus closing the same.

According to another feature of the present invention a tripping mechanism is coordinated with the weighing mechanism to discharge the scale after the hopper has been closed.

According to another feature of my invention the tripping mechanism is so controlled by the operating mechanism of the machine as to trip the scale, when the machine is ready for operation, for instance when the injection piston has completed the preceding injection stroke. Therefore, the injection cylinder will not be charged if the preceding injection stroke has not been completed for one reason or another leaving material in the injection cylinder.

Preferably the tripping mechanism for the scale is put in operation on the return stroke of the injection piston, whereby the material is dropped into a charging cylinder, from which it is subsequently discharged into a chute leading to the injection cylinder, after the injection piston has completed its return stroke and before it will perform the subsequent injection stroke.

In a preferred embodiment of the machine, the tripping mechanism is operated pneumatically by compressed air.

According to a further feature of the invention the charging device controls the operation of the injection piston in such a way, that the latter will not be put into operation until the charging device has properly charged the injection cylinder. This may be accomplished by an arrangement in which a charging slide guided in a charging cylinder is driven by an auxiliary pneumatic piston and, at the end of its stroke, initiates the pneumatic operation of the injection piston.

Preferably, compressed air is supplied by a common conduit to the return side of the auxiliary piston and to the tripping mechanism, the common conduit being opened only when the injection piston has completed its injection stroke.

In this arrangement, a valve may be inserted in the controlling conduit for the charging device, this valve being closed during the return stroke of the injection piston and being opened only after the injection piston has fully completed its injection stroke. This may be accomplished in a very simple manner by causing a member moving concurrently with the injection piston to operate the valve by a lost motion connection.

A preferred embodiment of the invention is illustrated in the accompanying drawings.

Fig. 2 is a vertical section through the machine taken along the central plane thereof and, partly, along an offset plane through a valve casing, Fig. 3 is a section taken along line 3—3 of Fig. 2.

Fig. 4 is the section taken along line 4—4 of Fig. 2.

Figure 1:
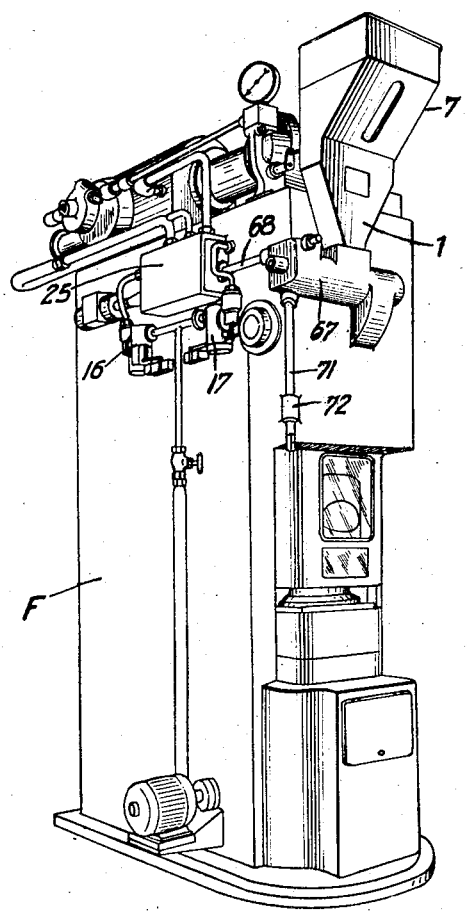
Fig. 1 is a perspective view of the machine.

The injection molding machine illustrated in Fig. 1 comprises a frame F carrying a vertical injection cylinder S. On suitable vertical guiding means of the frame F, there is slidably guided a table T carrying a composite mold M. Suitable means including a spindle R, a worm wheel W and a worm Q are provided to raise or lower the table T. When the table is raised it presses the mold M against nozzles N of a heating element H which surrounds conduits connecting the nozzles N with the injection cylinder S.

After the space 28 of the injection cylinder S has been charged with a predetermined quantity of thermoplastic material in a manner to be described hereinafter, the injection piston 36 is depressed in order to press the material through the conduits of the heating element H, where it is heated to plastic condition, and to inject the plastic material into the mold M. In this mold the material cools off and solidifies. The mold is then lowered and thereby withdrawn from the nozzles N and is subsequently opened whereupon the finished work piece is ejected. All of these successive operations are preferably performed automatically. As the means serving this purpose are wellknown in the art, a detailed description need not be given herein.

The injection piston 36 is driven by compressed air through the intermediary of a toggle linkage which produces a progressively increasing pressure, as the injection piston 36 advances. This linkage comprises two toggle links 58 and 59. The link 59 which may be formed by a bifurcated member straddling the injection cylinder S is pivoted on trunnions 60 attached to the frame of the machine, while the link 58 is pivoted on a trunnion 61 attached to a sliding member 62 carrying the injection piston 36. The upper end of the link 58 is connected by a rod 63 with a plunger 64 mounted for reciprocation within a horizontal cylinder Z. Between its ends the toggle link 58 carries a transverse pin 65, on which the toggle link 59 is journalled. The plunger 64 is shown in retracted position in which the piston 36 assumes its upper position. The plunger is integral with a piston 35 which may be urged towards the right by compressed air entering the space 18 through a pipe 33. When this occurs, the toggle link 59 will guide the pin 65 on an arcuate path about the trunnions 60 causing the toggle link 58 to depress the piston 36. Hence, when the piston 35 is urged with a uniform force from the position illustrated in Fig. 2 towards the right, the toggle linkage will press the injection piston 36 downwardly with a progressively increasing force.

In order to feed accurately the same quantity of material to a chute 27 terminating in the pressure space 28, a measuring mechanism is mounted above the chute. This mechanism which is shown in elevation in Fig. 4, includes a weighing mechanism mounted within an upwardly flaring housing 1 in form of an adjustable balance comprising a scale 2, a beam 3, a balance weight 4 adjustably shiftable on the beam, a curved shutter 5 and a depending arm 6. Above the scale 2 a hopper 7 is located containing a granulated thermoplastic material. The discharge opening 8 of the hopper is located directly above the circular path of the shutter 5 and is adapted to be closed thereby. When a predetermined quantity of material has been discharged from the hopper onto the scale 2 outweighing the weight 4, the balance will tilt on its pivot in a counter-clockwise direction thus closing the hopper 7 by the shutter 5. The quantity of thermoplastic material resting on the scale 2 at the instant when this occurs may be accurately determined by a suitable adjustment of the weight 4 so as to correspond to the volume of the mold M and to the specific gravity of the material. For larger work pieces the weight 4 is adjusted on the same beam 3 towards the right whereas it is shifted more towards the left for smaller work pieces.

The downwardly depending arm 6 of the balance projects into the path of a tripping mechanism. This tripping mechanism may be in form of a rod 10 attached to a piston 12 movable within a stationary cylinder enclosing a spring tending to hold the rod 10 in its normal position. When compressed air is admitted through a conduit 11 to the cylinder, it will urge the piston 12 and the rod 10 towards the right. The rod will engage the arm 6 and will tip the balance moving it to the position indicated by dotted lines so as to discharge the scale. A stop pin 13 cooperates with the shutter 5 or the beam 3 respectively to limit the pivotal movement of the scale. The material is discharged from the scale 2 through a port 14 into a cylinder enclosing a discharging slide in form of a plunger 15.

The peripheral length of the shutter 5 is sufficient to hold the hopper opening 8 closed while the balance is tipped. It is an essential feature of the present invention that the shutter is connected with the balance for common movement in order to close the opening 8 without delay at the instant when the material dropped on the scale 2 has reached the predetermined weight. The embodiment shown is capable of numerous modifications. Thus, the shutter may be in form of a slide connected with the balance by a pin and slot connection. Moreover, the tripping mechanism 10 may be operated by other than pneumatic means, for instance by a linkage or by an electromagnet.

While in injection molding machines of the known types the material is fed to the heating cylinder by the injection piston, the present invention involves a different method in that the medium driving the injection piston is controlled by the discharging slide 15 whereby the injection piston will not be advanced until the material has been fed to the injection cylinder S. Moreover, means are provided to ensure that the operation of the machine will be interrupted unless the injection piston advances to a predetermined point on its injection stroke. This is a very important feature of the present invention, as will appear from the following consideration.

It was mentioned above, that the pressure exerted on the injection piston 36 by the driving piston 35 increases progressively as the piston 36 advances. Therefore, the final pressure exerted on the thermoplastic material when the form is filled depends on the final position of the injection piston. It will be larger if the piston comes to rest at a lower point of its stroke and it will be smaller when the form becomes completely filled at an earlier point of the stroke. The length of the stroke, however, and, therefore, the final position of the piston depends on the quantity of material charged to the injection cylinder. It follows that variations in the charge will necessarily result in corresponding variations of the final pressure. In other words, a larger surplus of the material over the volume of the mold arresting the piston at a higher point of its stroke will result in a lower final pressure, whereas a smaller surplus permitting the piston to advance farther downwardly will result in a higher final pressure. The present invention is based on the discovery that the maintenance of the final pressure at a constant invariable rate is essential for the production of work pieces of a uniform quality, as the density and specific gravity of the finished work pieces depend largely on the final pressure exerted thereon during the solidifying phase. Apparently, these facts have not been recognized prior to the present invention.

In Figures 1 and 2 two casings 16 and 17 are shown including valves adapted to be operated by electromagnets 66. Either valve is normally in a position in which it connects a coordinated pipe 20, or 50 respectively, with the atmosphere. When its electromagnet 66 is energized, however, the valve will connect its pipe with a source of compressed air. A manual switch, not shown, may be shifted so as to close a circuit either through the one or through the other electromagnet 66. Therefore, one of the conduits 20 or 50 is always connected to a source of compressed air while the other one is simultaneously connected with the atmosphere.

The conduits 20 and 50 communicate with ports in the end walls of a casting 25 accommodating a slide valve 21. This valve controls the conduits 33 and 37 (Fig. 2) of the operating cylinder Z and suitable conduits communicating with a cylindrical space 23 of the casting 25 enclosing a piston 24 operating the charge slide 15, Fig. 4. The location of the various control ports and conduits will appear from a description of their function following hereinafter.

It will appear from Fig. 1 that the casting 25 is mounted on the side of the frame F while the cylinder 67 accommodating the slide 15 and supporting the housing 1 is mounted on the front of the frame F. Therefore, suitable motion-transmitting means must be interposed between the slide 15 and the piston 24. These means comprise a rod 68 (Figs. 1 and 2) connected with the piston 24 and suitably guided for reciprocatory motion in the castings 25 and 67. The front section of the rod 68 is provided with rack teeth 69 meshing with a pinion 70 fixed to a vertical shaft 71 journalled in the casting 67 and a bracket 72. A second pinion 73 attached to the shaft 71 meshes with rack teeth provided on a rod 26 connected with the slide 15.

For initiating a cycle of operation, the operator shifts the switch controlling the valves 16 and 17 to a position in which the conduit 20 is connected with the source of compressed air while the conduit 50 is connected with the atmosphere. The compressed air will enter the cylindrical space enclosing the slide valve 21 and will shift the same from the position shown in Fig. 2 to the right hand position thereof, whereby the mouth of a conduit 22 is uncovered and exposed to the compressed air which will flow into the left hand side of the cylinder 23 moving the piston 24 guided therein towards the right hand end position shown in Fig. 1. Through the motion-transmitting train 68, 71 and 26, the slide 15 is shifted to the position illustrated in Fig. 4 thus discharging the material deposited within the discharge cylinder into a chute 27 leading to the injection cylinder as shown in Fig. 2. Only when the discharge piston 24 has been advanced to its end position shown in Fig. 1, will a port 29 of the hollow end 30 of the piston rod 26 be uncovered. Up to this point in the operation the port 29 was positioned within and kept closed by a sleeve 31 in which the end 30 of the piston rod fits tightly. The compressed air entering the cylinder 23 through the conduit 22 flows through the port 29, the hollow piston rod 30 and a port 32 of the piston 24 and through a conduit in the casting into an annular recess 34 of the slide 21 and, thence, into the conduit 33. Through this conduit the compressed air enters the cylinder Z (Fig. 2) driving the piston 35 towards the right whereby the injection piston 36 will be pressed downwardly through the interposed toggle linkage 58, 59.

The air included on the right hand side of the piston 35 was exhausted during this phase of the cycle through the conduit 37 (Figs. 1 and 2) communicating through a branch with an annular recess 38 of the slide 21 and from there through a port 39 communicating with the atmosphere. Similarly, the air included in the cylinder 23 on the right hand side of the piston 24 was exhausted through a conduit 40 communicating with the recess 38.

Shortly before the operating plunger 64 (Fig. 2) reaches the end of its working stroke, a fork 42 connected therewith engages a collar 43 of a slidable rod 44 shifting the same a short distance towards the right. This rod constitutes a continuation of a rack 45 engaging a pinion 46 connected by a shaft 47 with a rotary valve 48 (Fig. 3. At the end of the preceding cycle of operation this valve had been moved to the position shown in Fig. 2 by engagement of the fork 42 with a collar 57 of the rod 44. In this position which is illustrated by dotted lines in Fig. 1, the valve interrupted the communication of a conduit 49 terminating in the right hand side of the cylinder 23 with a port 74 controlled by the right hand end of the slide valve 21.

Only if this communication is open, it is possible to continue the normal operation upon completion of the injection stroke by shifting the valves 16 and 17 so as to admit compressed air through the conduit 50 which will shift the slide valve 21 to the position shown in Fig. 1 and will then enter the port 74 and the conduit 49 to move the piston 24 towards the left carrying with it the charge slide 15.

Before the operator shifts the valves 16 and 17 to perform this operation he must wait for an interval sufficient to allow the material injected into the mold to solidify. The compressed air entering through the conduit 50 will not only move the piston 24 towards the left as just described but will also enter the conduit 37 and the annular space 19 of the cylinder Z returning the piston 35 and the injection piston 36 to initial position. Moreover, the compressed air will flow from the cylinder 23 through a port 52 and the conduit 11 to the tripping cylinder whereby the scale will be tipped. The material discharged from the scale will drop through the port 14 into the discharge cylinder to be stored therein for subsequent discharge into the chute 27 during the next cycle. During the return stroke of the driving piston 35, the air is exhausted from the space 18 of the cylinder Z and from the left hand space in the cylinder 23 through the conduit 33 and through the branch 53 thereof which communicates with an exhaust port 56 through an annular recess 54 of the slide valve 21.

The machine is then in initial position and ready for the initiation of the next cycle.

If for some reason or another the injection cylinder space 28 should be charged with an excessive quantity of material preventing the piston 36 from advancing to its end position, the fork 42 will not engage the collar 43 so that the valve 48 will remain closed. In this event, the piston 24 and the discharge slide 15 will remain in the position illustrated in Fig. 1 and the scale 2 will not be tipped. When a new cycle of operation is initiated, the compressed air entering the cylinder 23 through the conduit 22 will find the piston 24 in its right hand end position and will therefore immediately enter the port 29 and the conduit 33. Hence, it will appear that the operation of the injection piston will be repeated, but that no new material will be supplied to the injection cylinder 28.

While I have described my invention with reference to a specific embodiment thereof, I wish it to be clearly understood that the invention is not limited to the details thereof but is capable of numerous modifications within the scope of the appended claims.

What I claim is:

1. In an injection molding machine, the combination comprising an injection cylinder, a conduit adapted to establish a communication between the same and a mold, a piston in said injection cylinder, a driving mechanism for said piston, heating means coordinated with said conduit, a weighing mechanism comprising a scale adapted to weigh a charge of thermoplastic material, and a chute connecting said weighing mechanism with said cylinder, said driving mechanism being constructed and arranged to effect cyclic operation of said piston at regulated intervals, and means conditioned by the successive injection strokes of said piston, and acting exclusively upon completion of each such stroke, to actuate said scale and cause the same to discharge a predetermined weighed increment of material to said chute.

2. An injection molding machine comprising an injection cylinder, a balance comprising a scale mounted at a higher level than the same, a chute leading from said balance to said cylinder, a hopper above the scale of said balance, a shutter adapted to close said hopper, a cooperative connection being provided between said shutter and said balance for closing said hopper when a predetermined quantity of material has been fed through said hopper to said scale and depresses the latter, a tripping mechanism coordinated to said balance and for discharging the scale thereof after said hopper has been closed, a conduit adapted to establish a communication between said injection cylinder and a mold, a piston in said injection cylinder, and means for driving said piston towards said conduit, said tripping mechanism being connected with said driving means and conditioned in its successive operations by the operative position of said piston.

3. An injection molding machine comprising an injection cylinder, a balance comprising a scale mounted at a higher level than the same, a chute leading from said balance to said cylinder, a hopper above the scale of said balance, a shutter adapted to close said hopper, a cooperative connection being provided between said shutter and said balance for closing said hopper when a predetermined quantity of material has been fed through said hopper to said scale and depresses the latter, a tripping mechanism coordinated to said balance and for discharging the scale thereof after said hopper has been closed, a conduit adapted to establish a communication between said injection cylinder and a mold, a piston in said injection cylinder, means for driving said piston towards said conduit, a driving mechanism for said piston, and means operative to actuate said tripping mechanism only if said piston has completed its injection stroke towards said conduit.

4. An injection molding machine comprising an injection cylinder, a balance comprising a scale mounted at a higher level than the same, a chute leading from said balance to said cylinder, a hopper above the scale of said balance, a shutter adapted to close said hopper, a cooperative connection being provided between said shutter and said balance for closing said hopper when a predetermined quantity of material has been fed through said hopper to said scale, a pneumatically operable member adapted to engage and to tip said balance to discharge said scale, a valve controlling said member, a conduit adapted to establish a communication between said injection cylinder and a mold, a piston in said injection cylinder, means for driving said piston towards said conduit, and means operable concurrently with the movement of said piston and causing said valve to admit a medium operating said member, when said piston has completed its stroke towards said conduit.

5. An injection molding machine comprising an injection cylinder, a balance comprising a scale mounted at a higher level than the same, a chute leading from said balance to said cylinder, a hopper above the scale of said balance, a shutter adapted to close said hopper, a cooperative connection being provided between said shutter and said balance for closing said hopper when a predetermined quantity of material has been fed through said hopper to said scale and depresses the latter, a tripping mechanism coordinated to said balance and for discharging the scale thereof after said hopper has been closed, a conduit adapted to establish a communication between said injection cylinder and a mold, a piston in said injection cylinder, means for driving said piston towards said conduit, and a controlling mechanism adapted to control said means and said tripping mechanism including a valve adapted to disable said tripping mechanism if said piston fails to complete its stroke.

EMIL HEMPEL.